(12) United States Patent
Lu et al.

(10) Patent No.: US 8,018,098 B2
(45) Date of Patent: Sep. 13, 2011

(54) PORTABLE SOLAR POWER SUPPLY SYSTEM AND ITS APPLYING DEVICE

(75) Inventors: Yuan-Jui Lu, Taipei (TW); Kai-Shen Chen, Taipei (TW)

(73) Assignee: Solar Focus Technology Co., Ltd., Taipei (TW)

( * ) Notice: Subject to any disclaimer, the term of this patent is extended or adjusted under 35 U.S.C. 154(b) by 583 days.

(21) Appl. No.: 12/160,617

(22) PCT Filed: Apr. 26, 2006

(86) PCT No.: PCT/CN2006/000791
§ 371 (c)(1),
(2), (4) Date: Jul. 11, 2008

(87) PCT Pub. No.: WO2007/079623
PCT Pub. Date: Jul. 19, 2007

(65) Prior Publication Data
US 2009/0295234 A1    Dec. 3, 2009

(30) Foreign Application Priority Data

Jan. 12, 2006 (CN) .......................... 2006 1 0001294

(51) Int. Cl.
*H02J 9/06* (2006.01)
(52) U.S. Cl. ...................................................... 307/150
(58) Field of Classification Search .................. 307/150; 250/200; 606/418; 320/101; 136/244
See application file for complete search history.

(56) References Cited

U.S. PATENT DOCUMENTS

| | | | |
|---|---|---|---|
| 5,659,465 A * | 8/1997 | Flack et al. ...................... 363/71 |
| 6,133,642 A | 10/2000 | Hutchinson | |
| 6,384,570 B2 | 5/2002 | Matsuyama | |
| 6,806,684 B2 | 10/2004 | Matsuyama | |
| 6,870,089 B1 | 3/2005 | Gray | |
| 6,899,098 B2 | 5/2005 | Durbin | |
| 7,068,017 B2 * | 6/2006 | Willner et al. ................. 323/272 |
| 7,263,945 B2 * | 9/2007 | Little ............................. 114/292 |
| 7,750,502 B1 * | 7/2010 | Haun et al. ....................... 307/64 |
| 7,780,314 B2 * | 8/2010 | Seabrook ....................... 362/294 |
| 2001/0004198 A1 | 6/2001 | Matsuyama | |
| 2003/0038610 A1 | 2/2003 | Munshi et al. | |
| 2003/0141846 A1 | 7/2003 | Matsuyama | |

FOREIGN PATENT DOCUMENTS

CA    2493650 A1    7/2005

(Continued)

OTHER PUBLICATIONS

International Search Report corresponding to International Application No. PCT/CN06/00791 Mailed Sep. 7, 2006 (Chinese).

(Continued)

*Primary Examiner* — Albert W Paladini
(74) *Attorney, Agent, or Firm* — Ming Chow; Sinorica, LLC

(57) ABSTRACT

A portable solar power supply system and its applying device are disclosed. The power supply system includes a receiving unit, a control block and a storage unit. After the receiving unit receives a solar power, the control block is used for storing the solar power into the storage unit. If a user wants to use a portable information processing device or other portable products, the portable solar power supply system supplies electric power to the device or product and extends the working time without limitations.

16 Claims, 9 Drawing Sheets

FOREIGN PATENT DOCUMENTS

| | | |
|---|---|---|
| JP | 11069658 A | 3/1999 |
| JP | 1999-217708 A | 8/1999 |
| JP | 200117801 A | 6/2001 |
| JP | 2003141846 A | 7/2003 |
| KR | 20020048490 A | 6/2002 |
| KR | 2003633220000 | 9/2004 |
| KR | 2005-34706 | 4/2005 |
| WO | WO-2005-034303 A1 | 4/2005 |
| WO | WO-2005-034662 A1 | 4/2005 |

OTHER PUBLICATIONS

International Search Report corresponding to International Application No. PCT/CN06/00791 Mailed Sep. 7, 2006 (English).

* cited by examiner

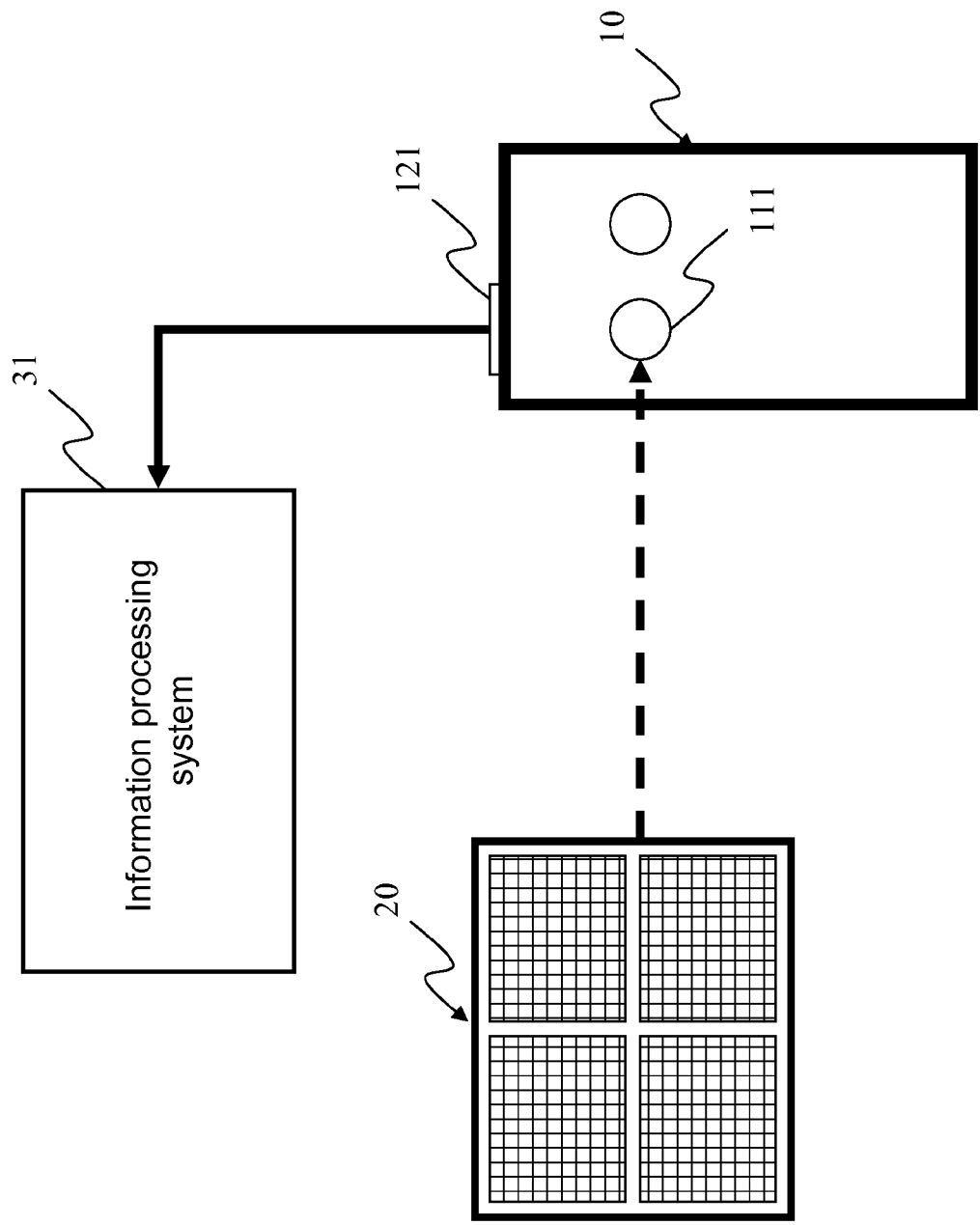

PORTABLE SOLAR POWER SUPPLY SYSTEM AND ITS APPLYING DEVICE

BACKGROUND OF THE INVENTION

1. Field of the Invention

The present invention relates to a power supply system, and more particularly to a solar power supply system that receives sunlight (or solar energy) and converts the solar energy into electric energy (or an electric power source), and the solar power supply system can be applied in various portable information processing devices or other portable products.

2. Description of the Related Art

As science and technology advance, various new technological products make our life more convenient, but all kinds of natural resources are exhausted more quickly when our environments are developed continuously. To overcome fuel shortage (including petroleum and coal), energy crisis and environmental pollution, scientists, researchers and engineers need to find an effective way of exploring new energy sources to protect our environment.

Solar energy, a natural electromagnetic wave, complies with the aforementioned requirements and causes no chemical pollution (such as carbon dioxide, carbon monoxide, sulfur dioxide, nitric oxide and dust), radiations or radioactive substances. Solar energy also has another feature of causing no thermal pollution at all, and providing an everlasting energy source with unlimited access.

In the past development process of applying the source of solar energy, the issue of uncollectible radiations was raised all the time. As science and technology advance, collectors (which are solar panels) are used to overcome the radiation issue. For the issue of intermittence of solar light source (due to the inconsistence between daytime and nighttime), a thermal energy storage or battery is adopted to overcome the intermittence issue, so that the application of solar energy becomes well-developed and extensively used.

Although the development of science and technology has brought us the solar energy, the present applications of solar energy are still not popular in the area of portable devices yet, and thus most portable devices still use a traditional power supply for their operation, and the power supply and recharge are definitely an issue, and thus it is an important subject for designers and manufacturers to develop an improved solar power supply system.

SUMMARY OF THE INVENTION

In view of the shortcomings of the prior art, the present invention provides a portable solar power supply system and its applying device to overcome the shortcomings of the prior art.

It is a primary objective of the invention to combine a portable solar power supply system with various portable products and supports the required electric power of the portable products. The portable solar power supply system of the invention comprises a receiving unit, a control block and a storage unit. When the receiving unit receives a solar electric power, the control block is used for storing the solar electric power to the storage unit. When a user wants to use the portable information processing device or other portable products, the portable solar power supply system can be used for supplying the power required for the operation of the portable device and extending the working time of the portable device without limitations.

In the meantime, the present invention includes an input terminal of direct current power DC and different types of output interfaces of direct current power DC, such that it is also one of the objectives of the invention to alternately and flexibly use the solar electric power and the direct current power DC to further improve the convenience of the portable products.

The control block further comprises a charge controller, an overdischarge controller and a DC-DC converter, wherein the charge controller is used for controlling a charge of the storage unit by a direct current power DC, and the overdischarge controller is used for terminating a discharge of the storage unit to protect the storage unit if the direct current power DC is lower than a safe value, and the DC-DC converter stabilizes the direct current power DC at a specific value and outputs the direct current power DC to produce a voltage stabilization effect.

Embodiments and related drawings are used for a detailed description of the technical contents and characteristics of the present invention as follows:

BRIEF DESCRIPTION OF THE DRAWINGS

FIG. 4 is a schematic view of a structure of a first application of a portable solar power supply system in accordance with the present invention;

DETAILED DESCRIPTION OF THE PREFERRED EMBODIMENT

The present invention is illustrated in details by the description of a preferred embodiment together with its related drawings as follows.

Figure 1:
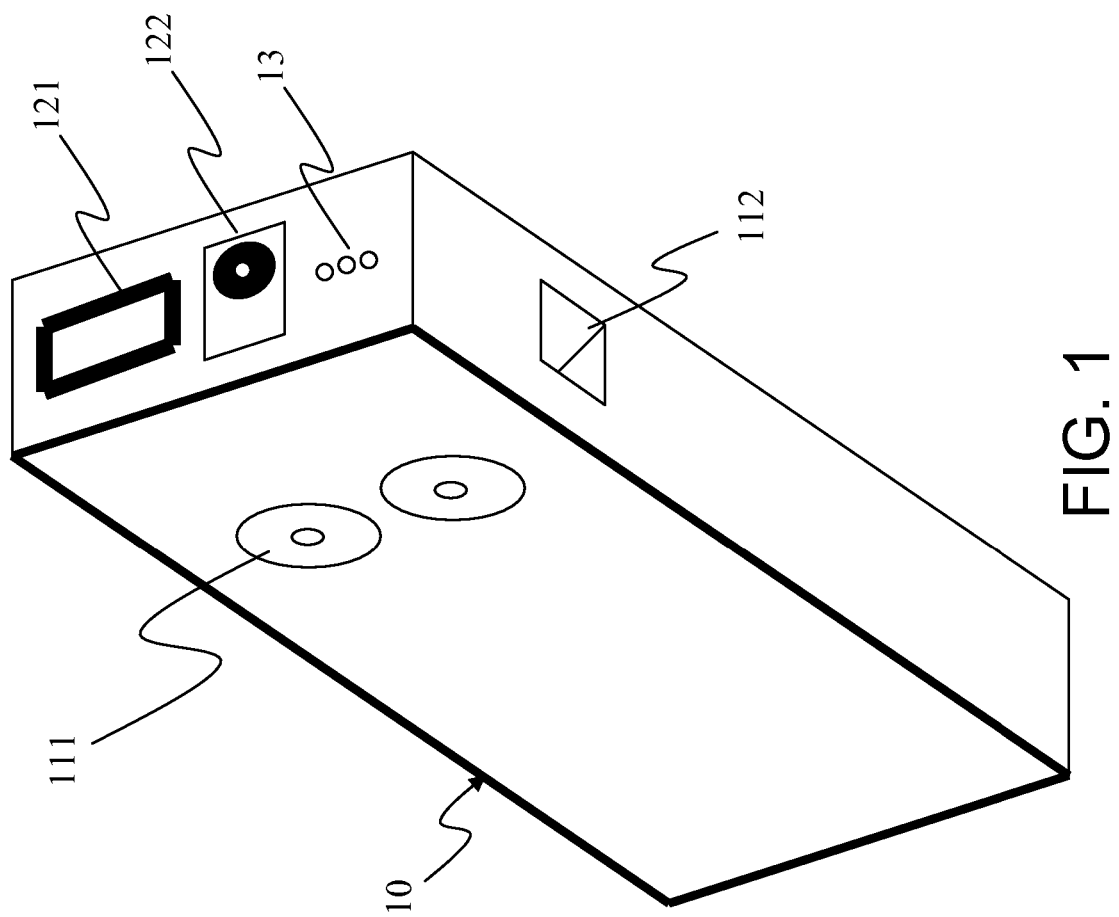
FIG. 1 is a perspective view of a portable solar power supply system in accordance with the present invention.

A portable solar power supply system of the invention includes various different structures that apply the portable solar power supply system. With reference to FIG. 1 for a perspective view of a portable solar power supply system in accordance with the present invention, designers can design the portable solar power supply system in a 3D stylish shape and having an external solar power receiving interface 111 and a DC power receiving interface 112. These two receiving interfaces 111, 112 can receive a solar power or directly use an external direct current power DC for the operation of the portable solar power supply system 10, and the portable solar power supply system 10 also installs a USB interface 121 and a DC power output interface 122, and these two output interfaces 121, 122 are used for transmitting the direct current power DC to the portable solar power supply system 10, and the display unit 13 is provided for displaying a working state (such as a charging, power supplying or low-power state) of the portable solar power supply system 10.

Figure 2:
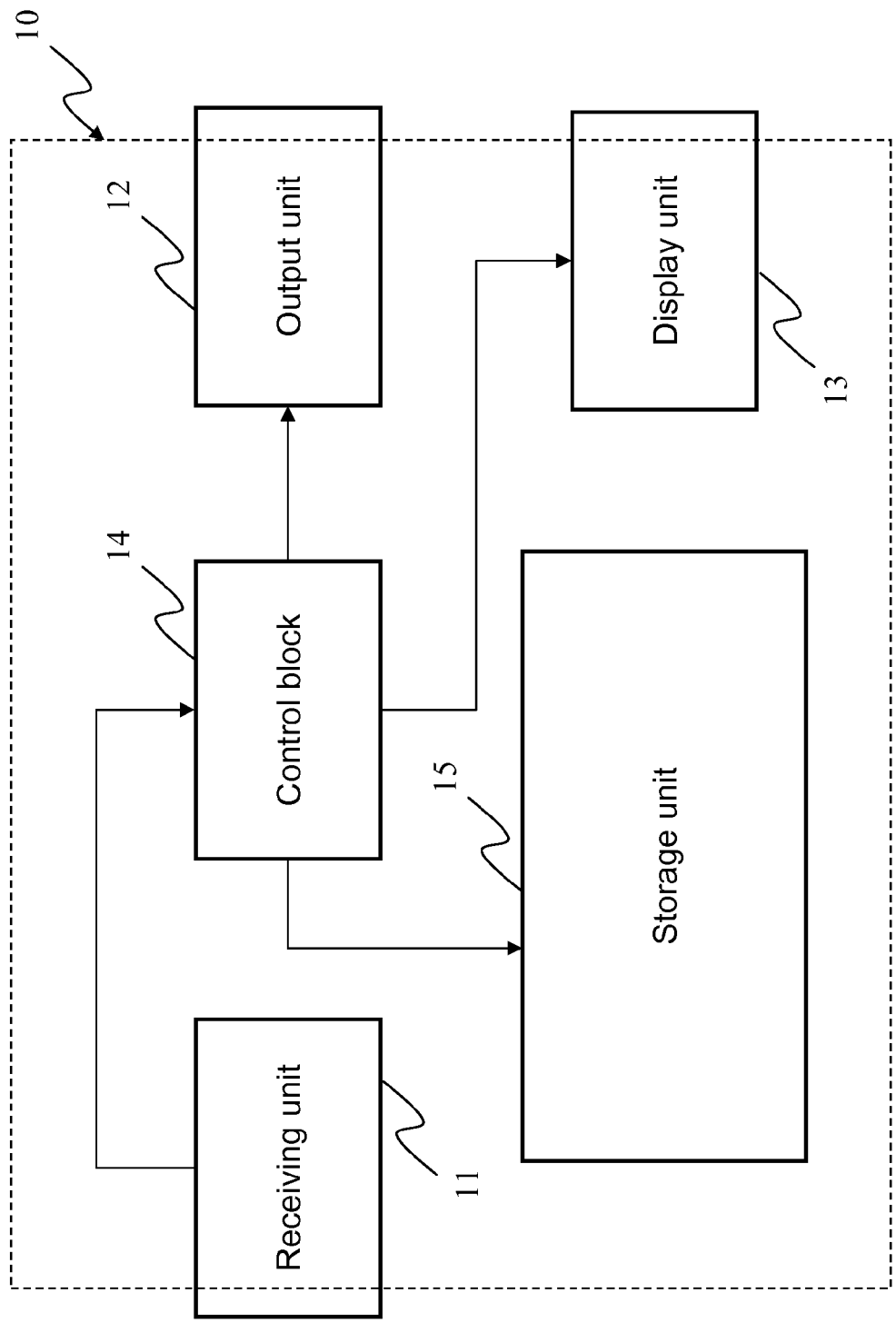
FIG. 2 is a schematic view of a circuit structure of a portable solar power supply system in accordance with the present invention.

With reference to FIG. 2 for a schematic view of a circuit structure of a portable solar power supply system in accordance with the present invention, the portable solar power supply system 10 comprises a receiving unit 11, an output unit 12, a display unit 13, a control block 14 and a storage unit 15, wherein the receiving unit 11 is coupled to a solar panel for receiving a solar power, and the control block 14 is coupled to the receiving unit 11 for converting the solar power into a direct current power DC, and stabilizing the direct current power DC at a specific value (for a voltage stabilization effect), while charging the storage unit 15, and thus the storage unit 15 must be a rechargeable battery used for storing the direct current power DC. If a user needs to have a power source, the direct current power DC will be transmitted to the portable solar power supply system 10, and the display unit 13 is coupled to the control block 14 for displaying a working state (such as a charging, power supplying, or low-power state) of the portable solar power supply system 10, and the output unit 12 is used for outputting the direct current power DC out from the portable solar power supply system 10.

Figure 3A:
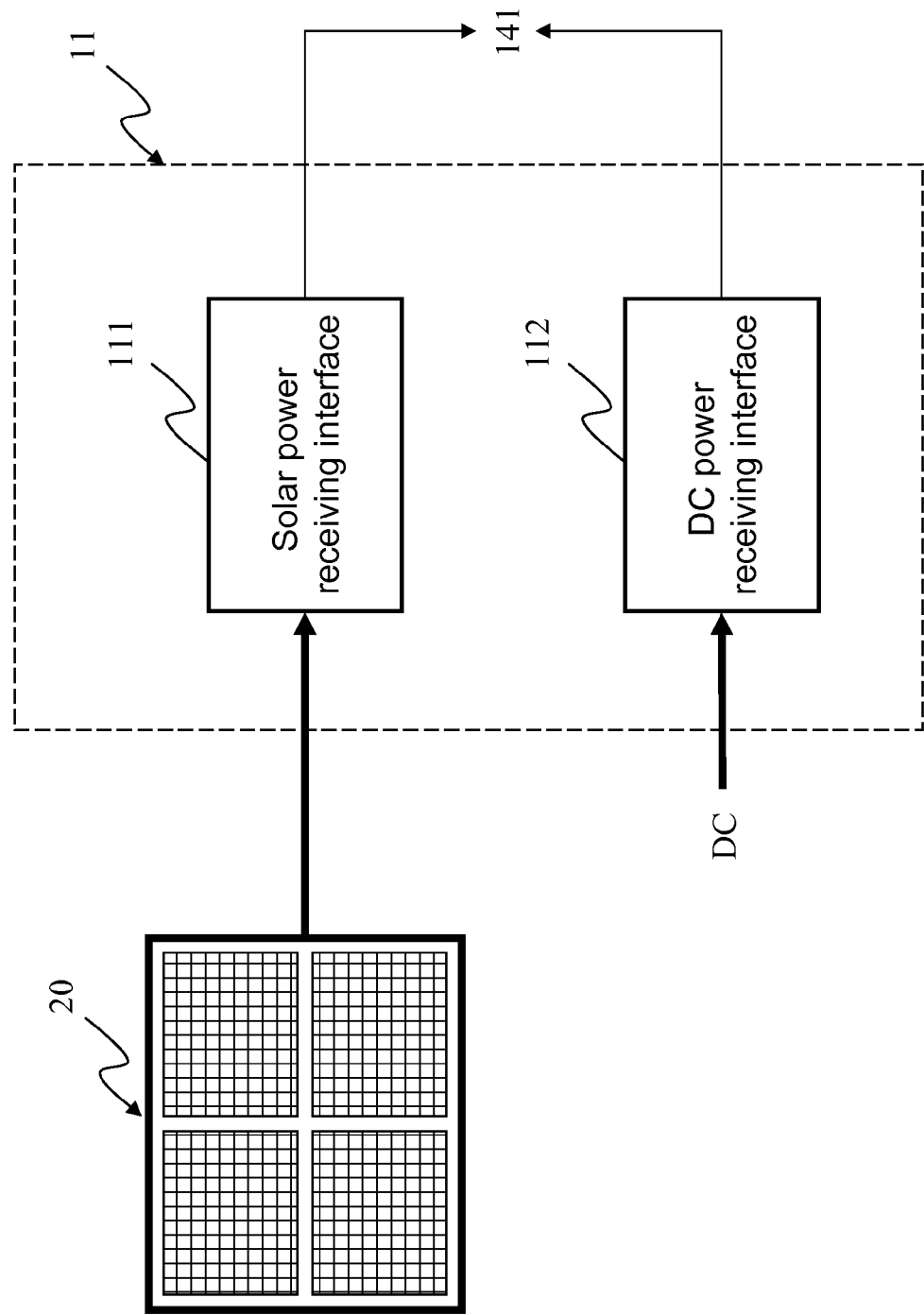
FIG. 3A is a schematic view of a receiving unit of a portable solar power supply system in accordance with the present invention.

With reference for FIG. 3A for a schematic view of a receiving unit of a portable solar power supply system in accordance with the present invention, the receiving unit 11 installed in the portable solar power supply system 10 further comprises a solar power receiving interface 111 and a DC power receiving interface 112, and the solar power receiving interface 111 is coupled to the solar panel 20, and the solar panel 20 can be a flexible solar panel. In addition to a specific elasticity, the flexible solar panel also features a light, thin and compact design for an easy connection to meet the requirements of a portable system. The DC power receiving interface 112 can be coupled directly and externally for supplying the external direct current power DC to different portable products or optionally charging the portable solar power supply system 10.

Figure 3B:
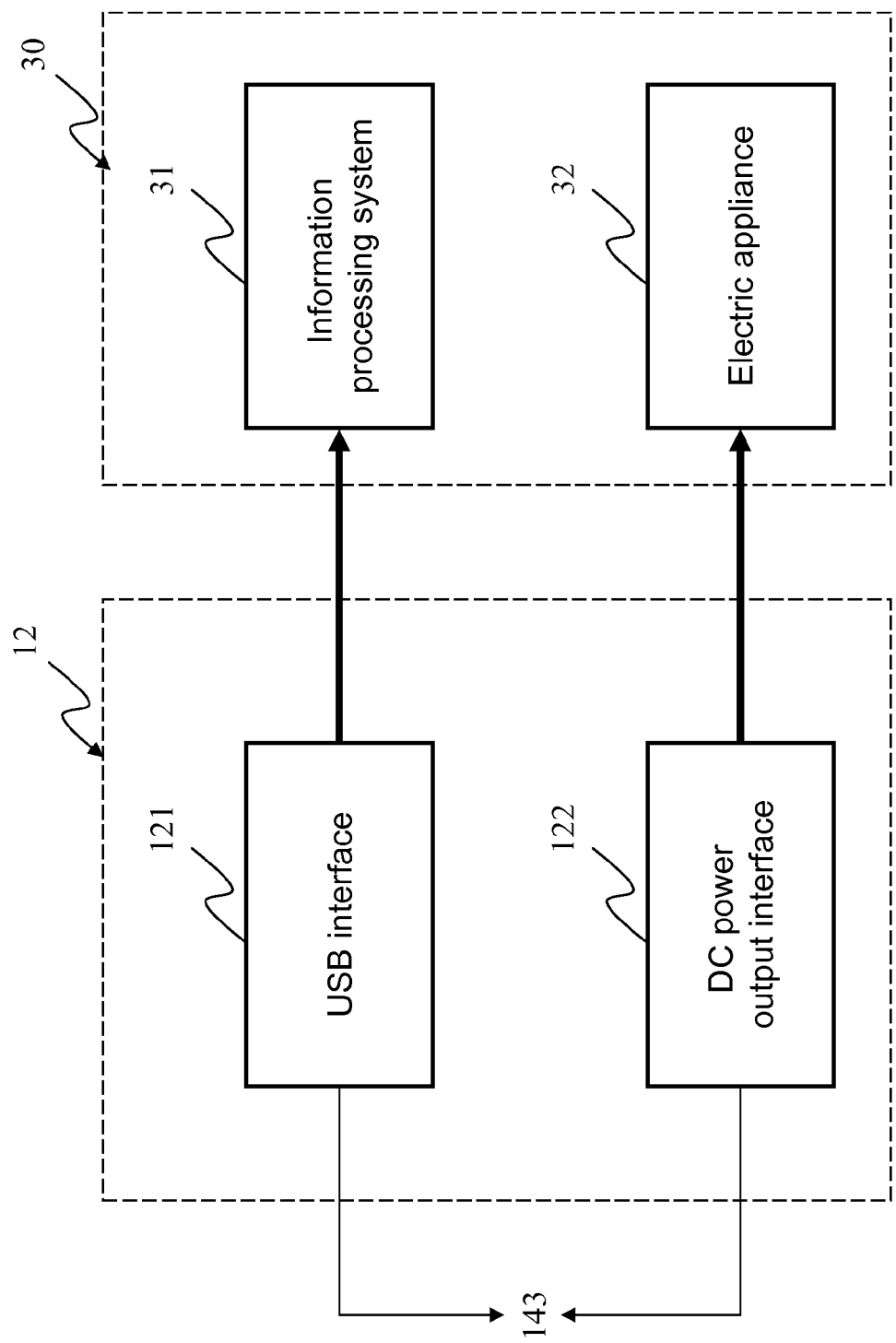
FIG. 3B is a schematic view of an output unit of a portable solar power supply system in accordance with the present invention.

With reference to FIG. 3B for a schematic view of an output unit of a portable solar power supply system in accordance with the present invention, the output unit 12 installed in the portable solar power supply system 10 can be designed as a data transmission interface with a power transmission function, and this interface can be one of the connecting interfaces such as a universal serial bus (USB) transmission interface and a Firewire transmission interface for connecting various different portable products 30. In this preferred embodiment, the data transmission interface is a USB interface 121 and a DC power output interface 122, wherein the USB interface 121 is coupled to an information processing system 31, and the DC power output interface 122 is a general power transmission connector for connecting a general portable electric appliance 32.

Figure 3C:
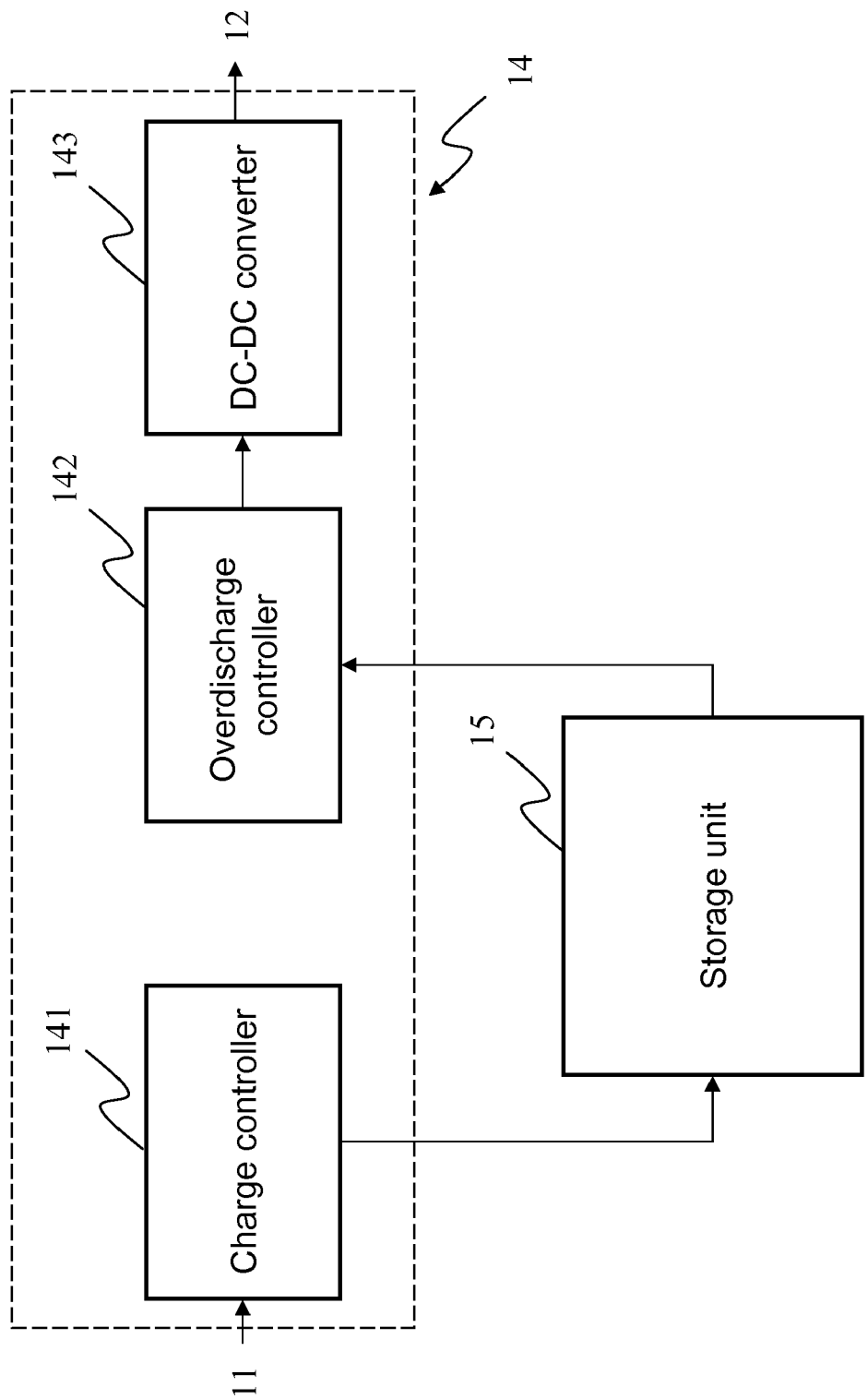
FIG. 3C is a schematic view of a control block of a portable solar power supply system in accordance with the present invention.

With reference to FIG. 3C for a schematic view of a control block of a portable solar power supply system in accordance with the present invention, the control block 14 of the invention comprises a charge controller 141, an overdischarge controller 142 and a DC-DC converter 143, wherein the charge controller 141 is used for controlling a charge of the storage unit 15 by the direct current power DC, and the overdischarge controller 142 is used for terminating a discharge of the storage unit 15 to protect the storage unit 15 if the direct current power DC is lower than a safe value, and the DC-DC converter 143 stabilizes the direct current power DC at a specific value and outputs the direct current power DC to produce a voltage stabilization effect. The control block 14 further comprises a filter for absorbing a surge and preventing the storage unit 15 from being damaged by the surge produced during the process of switching a power source.

With reference to FIG. 4 for a schematic view of a structure of a first application of a portable solar power supply system in accordance with the present invention, if a user connects the portable solar power supply system of the present invention with an information processing device 31, the working power source of the information processing device 31 is supplied by the portable solar power supply system 10, and the operation of the portable solar power supply system 10 includes the following steps. The solar panel 20 collects a solar light source, converts the solar light source into a solar power and transmits the solar power to the solar power receiving interface 111. The portable solar power supply system 10 converts the solar power into a direct current power DC, and the USB interface 121 discharges the direct current power DC. After a port of the information processing device 31 is connected to the USB interface 121, the portable solar power supply system 10 starts outputting an electric power source to the information processing device 31 and supplies electric power for the operation of the information processing device 31, wherein the receiving unit 11 (including a solar power receiving interface 111 and a DC power receiving interface 112) of the portable solar power supply system 10 is a magnetic interface, that uses the principle of like poles attracting each other to attach a transmission connector of the solar panel 20 for an electric charge and overcome the shortcomings of a traditional plug/unplug interface that will be damaged easily after a long time of use.

Further, the solar panel 20 includes a fixing means such as a clamp or an adhesive means for fixing the solar panel 20 at an appropriate position (such as a user's cloth, a car or any other device) for receiving solar energy. The portable solar power supply system 10 also installs a manual heating device (such as the way of producing heat by shaking or rubbing manually) for users to perform a charging manually in a cloudy day without sufficient sunlight.

The solar panel 20 further includes a plurality of equidistant protruding dots disposed on a surface of the solar panel 20, and the surface of each protruding dot is in an arc shape for collecting sunlight beams to expedite the charging process (by means of the focusing principle of a convex lens).

Since the present invention relates to a solar power supply system for receiving a solar energy and converting the solar energy into electric energy, and any heat loss incurs a low efficiency of the charging, therefore the solar panel 20 of the present invention can be wrapped with a layer of heat absorbing and insulating material, such as polylon, and the top of the power supply system is left open to prevent a quick heat dissipation. Alternately, the solar panel 20 can be installed in a closed space filled with carbon dioxide, such that a greenhouse effect (that absorbs heat easily, but discharges heat slowly) is produced by carbon dioxide to achieve the effect of reducing heat loss.

Figure 5:
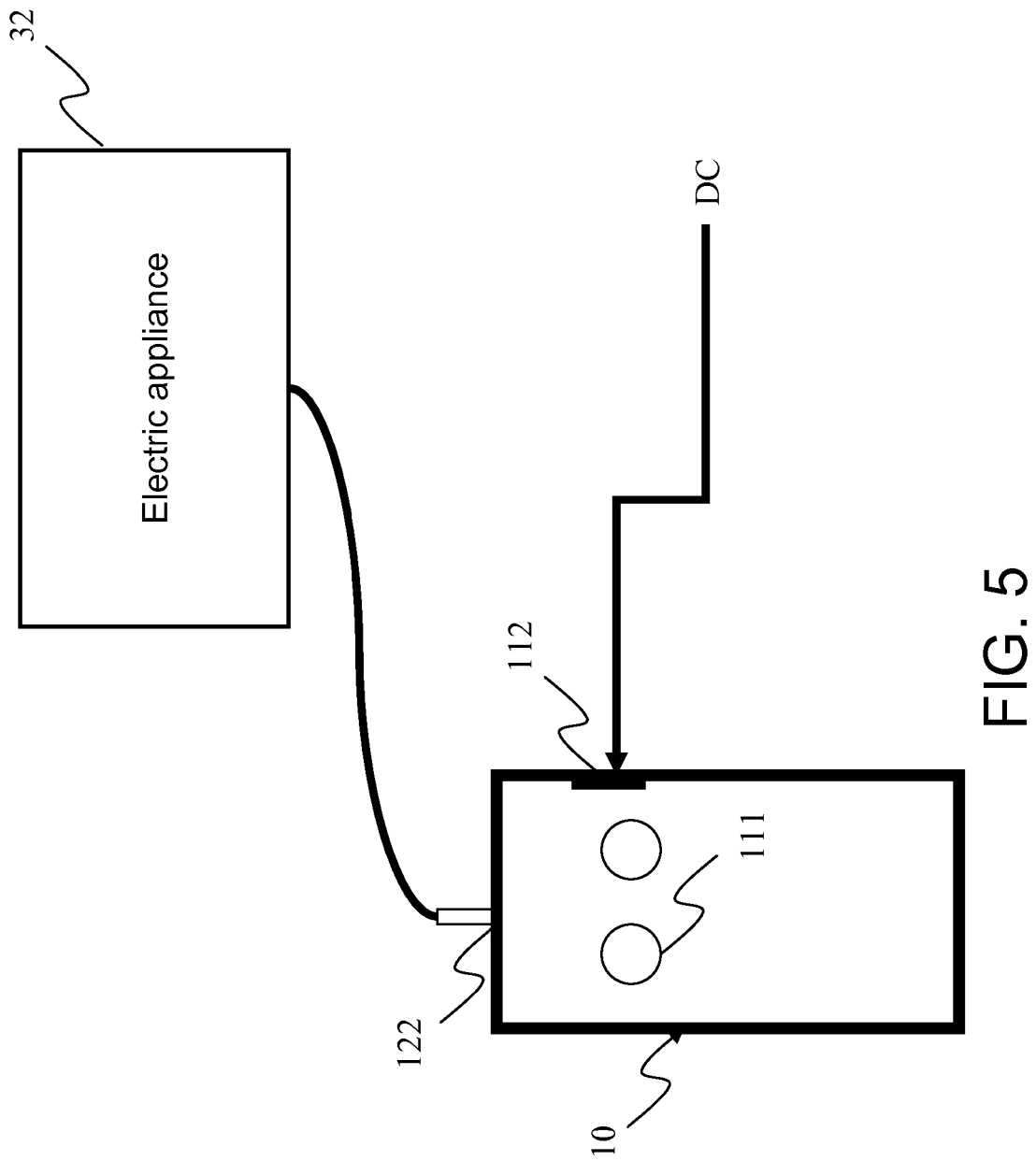
FIG. 5 is another schematic view of a structure of a first application of a portable solar power supply system in accordance with the present invention.

With reference to FIG. 5 for another schematic view of a portable solar power supply system in accordance with a first preferred embodiment, if a user connects the portable solar power supply system of the present invention with an electric appliance 32, the portable solar power supply system 10 supplies the required working power source to the electric appliance 32. If the level of electric power in the portable solar power supply system 10 is low and insufficient for the operation of the electric appliance 32, then the portable solar power supply system 10 will transmit an external direct current power DC to the DC power receiving interface 112, and discharge the direct current power DC (while charging the portable solar power supply system 10) through the DC power output interface 122. After a port of the electric appliance 32 is connected to the DC power output interface 122, the portable solar power supply system 10 will start outputting electric power to the electric appliance 32 for the operation of the electric appliance 32.

Figure 6:
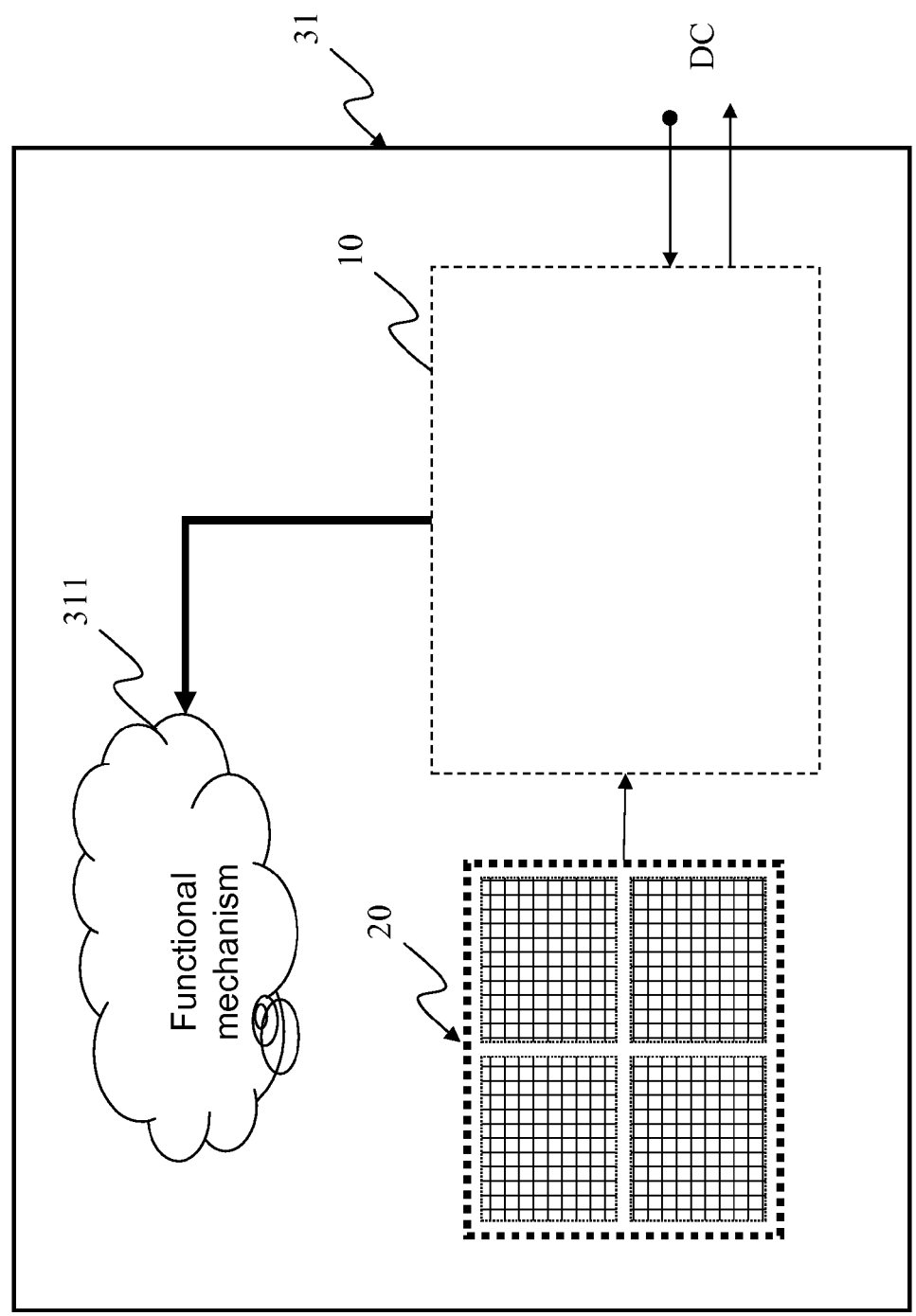
FIG. 6 is a schematic view of a structure of a second application of a portable solar power supply system in accordance with the present invention.

In addition to the concept of a power bank, the portable solar power supply system of the invention can be installed directly in an information processing device 31. With reference to FIG. 6 for a schematic view of a portable solar power supply system in accordance with a second preferred embodiment of the present invention, the solar panel 20 is installed on a surface of the information processing device 31 for receiving a solar light source, and the portable solar power supply system 10 installed in the information processing device 31 similarly supplies a direct current power DC (or a working power source), and the remaining direct current power DC is stored into the portable solar power supply system 10. Now, the rechargeable battery of the information processing device 31 is replaced by the portable solar power supply system 10, and the portable solar power supply system 10 supplies a working power source for a functional mechanism 311 to achieve a normal operation and function of the information processing device 31. Of course, the foregoing structure can be applied in any portable information processing device or electric appliance (such as a mobile phone, a personal digital assistant (PDA), a portable multimedia player (PMP), a notebook computer, a handheld game player and various related portable devices, etc).

Figure 7:
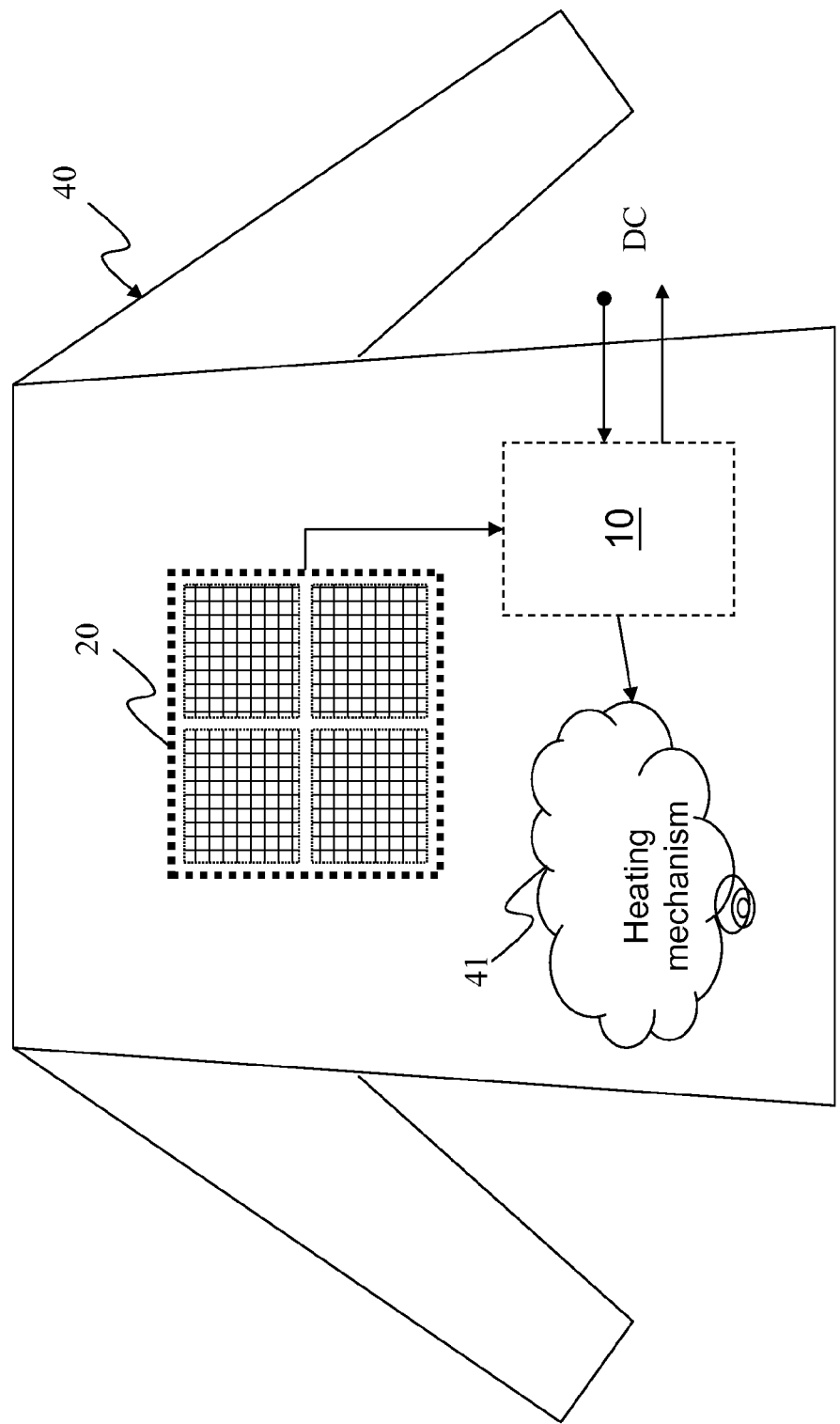
FIG. 7 is another schematic view of a structure of a second application of a portable solar power supply system in accordance with the present invention.

In addition to the foregoing preferred embodiments, the present invention further provides the following preferred embodiment without departing from the spirit of the present invention. With reference to FIG. 7 for another schematic view of a structure of a second application of a portable solar power supply system in accordance with the present invention, if the portable solar power supply system of the invention is combined with a cloth 40 (which is a portable device), a warming effect is created. The portable solar power supply system 10 provides the working power source to achieve a warming effect, and the working power source of the cloth 40 in the heating mechanism 41 is provided by power supply system 10. The solar panel 20 is installed on the surface of the cloth 40 for collecting a solar light source, converting the solar source into solar power, and transmitting the solar power to the portable solar power supply system 10 to produce a direct current power DC. Now, the direct current power DC is provided as a working power source of the heating mechanism 41 to charge the power supply system 10. The power supply system 10 also installs an output unit, such that if a user is using a portable device that requires a working power source, the user can connect the power supply system 10 to supply a direct current power DC, and such use is very convenient. In the meantime, the cloth 40 can be kept warm. The portable device 40 using this structure includes but not limited to a jacket, a cloth, a pair of trousers, a vest, and various different types of portable products.

While the invention has been described by means of specific embodiments, numerous modifications and variations could be made thereto by those skilled in the art without departing from the scope and spirit of the invention set forth in the claims.

What is claimed is:

1. A portable solar power supply system, comprising a receiving unit, a control block, a storage unit, an output unit and a display unit; the portable solar power supply system characterized in that:

the control block is simultaneously coupled to the receiving unit, the storage unit, the output unit and the display unit, and the control block further comprises a charge controller, an overdischarge controller and a DC-DC converter;

the receiving unit includes a solar power receiving interface and a DC power receiving interface, wherein, the solar power receiving interface is coupled to a solar panel for receiving a DC power converted from a solar power, the receiving unit receives the DC power and then transmitting the DC power to the control block, the DC power receiving interface is provided for receiving an external DC power and optionally supplying the external DC power to a portable product directly or optionally charging the portable solar power supply system with the external DC power;

the charge controller is simultaneously coupled to the receiving unit and the storage unit for controlling a charge of the storage unit by the DC power;

the overdischarge controller is coupled to the storage unit, and the overdischarge controller has a predetermined safe value, wherein the overdischarge controller terminates a discharge of the storage unit if the DC power stored in the storage unit is lower than the predetermined safe value;

the DC-DC converter is coupled to the output unit, and the DC-DC converter has a predetermined specific value, wherein the DC-DC converter is used for stabilizing the DC power at the predetermined specific value and then transmitting the DC power to the output unit, thereby outputting the DC power to the portable product through the output unit;

the control block simultaneously provides two functions of (1) stabilizing the external DC power from the DC power receiving interface and then optionally transmitting the DC power via the DC-DC converter to the output unit instead of transmitting the DC power to charge the storage unit; and (2) stabilizing the DC power discharged from the storage unit and then transmitting the DC power to the output unit;

the display unit is coupled to the control block for displaying working states of the portable solar power supply system, wherein the working states comprises at least a charging state, a power supplying state, and a low-power state.

2. The portable solar power supply system of claim 1, wherein the output unit includes a data transmission interface implemented with a power transmission function.

3. The portable solar power supply system of claim 1, wherein the portable solar power supply system includes a manual heating device installed thereon.

4. The portable solar power supply system of claim 1, wherein the receiving unit is a magnetic interface.

5. The portable solar power supply system of claim 1, wherein the solar panel are wrapped with polylon all around except the top of the solar panel.

6. The portable solar power supply system of claim 1, wherein the solar panel is installed in a closed space filled with carbon dioxide.

7. The portable solar power supply system of claim 1, wherein the solar panel installs a fixing means for fixing the solar panel at an appropriate position for receiving the solar power.

8. The portable solar power supply system of claim 1, wherein the storage unit is a rechargeable battery.

9. A portable information processing device with a portable solar power supply system, comprising at least one functional mechanism, at least one solar panel and a portable solar power supply system; the portable information processing device with a portable solar power supply system characterized in that:

the functional mechanism is provided for producing different functions of the portable information processing device;

the solar panel is provided for receiving a solar light source and converting the solar light source into a solar electric power; and the portable solar power supply system is simultaneously coupled between to the solar panel and the functional mechanism for outputting a DC power, thereby supplying the DC power to the functional mechanism;

the portable solar power supply system, comprising a receiving unit, a control block, a storage unit, an output unit and a display unit; the portable solar power supply system characterized in that:

the control block is simultaneously coupled to the receiving unit, the storage unit, the output unit and the display unit, and the control block further comprises a charge controller, an overdischarge controller and a DC-DC converter;

the receiving unit includes a solar power receiving interface and a DC power receiving interface, wherein, the solar power receiving interface is coupled to the solar panel for receiving a DC power converted from a solar power, the receiving unit receives the DC power and then transmitting the DC power to the control block, the DC power receiving interface is provided for receiving an external DC power and optionally supplying the external DC power to the portable information processing device directly or optionally charging the portable solar power supply system with the external DC power;

the charge controller is simultaneously coupled to the receiving unit and the storage unit for controlling a charge of the storage unit by the DC power;

the overdischarge controller is coupled to the storage unit, and the overdischarge controller has a predetermined safe value, wherein the overdischarge controller terminates a discharge of the storage unit if the DC power stored in the storage unit is lower than the predetermined safe value;

the DC-DC converter is coupled to the output unit, and the DC-DC converter has a predetermined specific value, wherein the DC-DC converter is used for stabilizing the DC power at the predetermined specific value and then transmitting the DC power to the output unit, thereby outputting the DC power to the portable information processing device through the output unit;

the control block simultaneously provides two functions of (1) stabilizing the external DC power from the DC power receiving interface and then optionally transmitting the DC power via the DC-DC converter to the output unit instead of transmitting the DC power to charge the storage unit; and (2) stabilizing the DC power discharged from the storage unit and then transmitting the DC power to the output unit;

the display unit is coupled to the control block for displaying working states of the portable solar power supply system, wherein the working states comprises at least a charging state, a power supplying state, and a low-power state.

10. The portable information processing device with a portable solar power supply system of claim 9, wherein the output unit includes a data transmission interface implemented with a power transmission function.

11. The portable information processing device with a portable solar power supply system of claim 9, wherein the storage unit is a rechargeable battery.

12. The portable information processing device with a portable solar power supply system of claim 9, wherein the portable information processing device is selected from the group consisting of a mobile phone, a personal digital assistant (PDA), a portable multimedia player (PMP), a notebook computer, and a handheld game player.

13. A portable device with a portable solar power supply system, comprising a heating mechanism, at least one solar panel and a portable solar power supply system; the portable device with a portable solar power supply system characterized in that:

the heating mechanism is provided for generating a heat source to maintain a temperature of the portable device;

the solar panel is provided for receiving a solar light source and converting the solar light source into a solar electric power; and the portable solar power supply system is simultaneously coupled between to the solar panel and the heating mechanism for outputting a DC power, thereby supplying the DC power to the heating mechanism;

the portable solar power supply system, comprising a receiving unit, a control block, a storage unit, an output unit and a display unit; the portable solar power supply system characterized in that:

the control block is simultaneously coupled to the receiving unit, the storage unit, the output unit and the display unit, and the control block further comprises a charge controller, an overdischarge controller and a DC-DC converter;

the receiving unit includes a solar power receiving interface and a DC power receiving interface, wherein, the solar power receiving interface is coupled to the solar panel for receiving a DC power converted from a solar power, the receiving unit receives the DC power and then transmitting the DC power to the control block, the DC power receiving interface is provided for receiving an external DC power and optionally supplying the external DC power to the portable device directly or optionally charging the portable solar power supply system with the external DC power;

the charge controller is simultaneously coupled to the receiving unit and the storage unit for controlling a charge of the storage unit by the DC power;

the overdischarge controller is coupled to the storage unit, and the overdischarge controller has a predetermined safe value, wherein the overdischarge controller terminates a discharge of the storage unit if the DC power stored in the storage unit is lower than the predetermined safe value;

the DC-DC converter is coupled to the output unit, and the DC-DC converter has a predetermined specific value, wherein the DC-DC converter is used for stabilizing the DC power at the predetermined specific value and then transmitting the DC power to the output unit, thereby outputting the DC power to the portable device through the output unit;

the control block simultaneously provides two functions of
(1) stabilizing the external DC power from the DC power receiving interface and then optionally transmitting the DC power via the DC-DC converter to the output unit instead of transmitting the DC power to charge the storage unit; and
(2) stabilizing the DC power discharged from the storage unit and then transmitting the DC power to the output unit;
  the display unit is coupled to the control block for displaying working states of the portable solar power supply system, wherein the working states comprises at least a charging state, a power supplying state, and a low-power state.

14. The portable device with a portable solar power supply system of claim 13, wherein the output unit includes a data transmission interface implemented with a power transmission function.

15. The portable device with a portable solar power supply system of claim 13, wherein the storage unit is a rechargeable battery.

16. The portable device with a portable solar power supply system of claim 13, wherein the portable device is selected from the group consisting of a jacket, a cloth, a pair of trousers and a vest.

* * * * *